United States Patent [19]

Morrow

[11] 4,171,397
[45] Oct. 16, 1979

[54] SHEET MATERIAL HAVING COMPOSITE FLUOROCHEMICAL-SILICONE RELEASE COATINGS

[75] Inventor: Charles M. Morrow, St. Paul, Minn.

[73] Assignee: Minnesota Mining and Manufacturing Company, St. Paul, Minn.

[21] Appl. No.: 897,753

[22] Filed: Apr. 17, 1978

[51] Int. Cl.² .................... B32B 3/10; B32B 27/08
[52] U.S. Cl. .................... 428/195; 428/352; 428/354; 428/421; 428/447; 427/261
[58] Field of Search ............... 428/195, 211, 352, 354, 428/421, 447, 451; 427/261

[56] References Cited

U.S. PATENT DOCUMENTS

| | | | |
|---|---|---|---|
| 3,061,567 | 10/1962 | Keil | 428/447 |
| 3,318,852 | 5/1967 | Dixon | 428/422 |
| 3,503,782 | 3/1970 | Ayres | 428/211 |
| 3,957,724 | 5/1976 | Schurb et al. | 428/447 |
| 4,039,707 | 8/1977 | O'Malley | 428/352 |

*Primary Examiner*—George F. Lesmes
*Assistant Examiner*—Alexander S. Thomas
*Attorney, Agent, or Firm*—Cruzan Alexander; Donald M. Sell; Richard E. Brink

[57] ABSTRACT

Sheet materials, such as pressure-sensitive tapes or release liners, are provided with a spectrum of composite coatings having desired release values. The release surfaces, which present both fluorochemical polymer and cured silicone polymer areas, are formed by first applying specific types of fluorochemical polymer and then overcoating with silicone-forming reactants.

13 Claims, No Drawings

SHEET MATERIAL HAVING COMPOSITE FLUOROCHEMICAL-SILICONE RELEASE COATINGS

BACKGROUND OF THE INVENTION

This invention relates to sheet material which exhibits release properties toward a wide variety of normally tacky and pressure-sensitive adhesives.

For many years manufacturers of inherently tacky mastics or adhesives have protected the compositions with such anti-stick, or "abhesive" materials as wax-coated paper, plastic films, plastic-coated paper, starch-impregnated fabrics, and extremely complex polymer systems.

Such polymer systems have found particular application as coatings on the back surface of normally tacky and pressure-sensitive adhesive tape wound in roll form, where they function as so-called low adhesion backsizes (LAB), facilitating use of the tape and preventing inadvertent transfer of the adhesives to the back surface. The force to separate the adhesive from an LAB coating is less than the force required to separate the adhesive in the absence of the LAB but is typically more than 80 grams per centimeter width. For exemplary polymeric low adhesion backsizes, see U.S. Pat. Nos. 2,532,011, 2,607,711, 2,876,894, 3,318,852 and 3,342,625.

For some products, e.g., labels or large adhesive-coated sheets sold in other than roll form, it is desirable to have a protective release liner to which normally tacky and pressure-sensitive adhesives adhere very weakly; U.S. Pat. Nos. 3,061,567, 3,518,325 and 3,671,485 are illustrative of such products, all of which are based on a silicone coating of some type. The force to separate a pressure-sensitive adhesive from a silicone-treated surface is typically in the range of 2–10 grams per centimeter of width. Generally speaking, it has previously been extremely difficult to obtain materials having release properties intermediate those of the LAB-type polymers and those of the silicones without sacrificing some other essential property. Recognizing the desirability of a release coating having properties intermediate the 10 grams per centimeter afforded by the silicones and the 500 grams per centimeter of typical low adhesion backsizes, attempts have been made to modify silicone polymers by blending or reacting them with other less effective release materials; see, e.g., U.S. Pat. Nos. 3,328,482, 3,527,659, 3,770,687 and 3,891,745. Some of the resultant hybrids so contaminate a pressure-sensitive adhesive that it loses its tack, while others gradually react with pressure-sensitive adhesives in such a manner that they cannot be separated after remaining in contact for an extended period of time. Many compositions are difficult to reproduce with consistency, exhibit changed release properties as the silicone gradually migrates to the surface or require cure temperature so high that they adversely affect the substrate on which they are coated.

One of the best products of the type described in the preceding paragraph is shown in U.S. Pat. No. 3,957,724, where the release agent is the reaction product of an isocyanate-terminated moiety and a liquid hydroxyl- or amine-containing organosilicone. This product, however, is effective with only a few specific adhesives.

Still another approach to obtaining release surfaces having properties intermediate those of silicones and the more conventional low adhesion backsizes is shown in U.S. Pat. No. 3,503,782. This patent discloses broadly the preparation of a release surface by uniformly applying a first release agent coating to a substrate so as to entirely cover the surface and then applying a second release agent to only a part of the area covered by the first release agent. The only examples shown involve the use of a conventional silicone as the first release agent and a filled silicone as the second release agent. This fact is not surprising, since most low-adhesion backsizes do not adhere to a silicone surface, and if a silicone release agent is applied over a conventional LAB, it tends to wet so excessively that it covers the entire surface, in effect yielding a release surface which is silicone alone.

SUMMARY OF THE INVENTION

The present invention provides, for the first time it is believed, a family of products in which a composite release surface comprises a silicone polymer and a non-silicone polymer to obtain a desired range of release property from 8 grams per centimeter to 350 grams per centimeter (or higher, if desired). The composite release surface can be consistently and predictably prepared using conventional in-line coating equipment and does not require the use of any unusual coating methods.

Products made in accordance with the invention have plural coatings which present areas of (1) fluorochemical polymer and (2) cured silicone polymer.

It has been empirically discovered that only certain fluorochemical polymers falling within the broad description just mentioned are effective in the practice of the invention. An effective fluorochemical polymer is one having surface energy properties such that the contact angle of a drop of 100% ethanol on a smooth surface thereof is at least 30°. Useful fluorochemical polymers consist essentially of a polymer of moieties consisting essentially of (a) perfluoroalkylsulfonamido lower alkyl acrylate in which the alkyl portion of the perfluoroalkylsulfonamido moiety contains 3–20, preferably 3–12, carbon atoms, (b) a perfluoroalkylsulfonamidoalkanol:toluene diisocyanate:hydroxypropylmethacrylate reaction product in which the alkylidene radical contains 1–11 carbon atoms and (c) 0–10% by weight, based on total polymer, of lower alkyl acrylate. These fluorochemical polymers are not traditionally regarded as LAB's in any sense; indeed, the fluorochemical polymers disclosed in U.S. Pat. No. 3,318,852 as having utility for use as LAB coatings, not only have surface energy properties such that ethanol forms a contact angle of less than 30° but also are unsuitable for use in the invention.

Silicones, including siloxane starting materials, accelerators, crosslinking agents, curing catalysts, and coating techniques are well-known; see, e.g., U.S. Pat. No. 3,061,567, the disclosure of which is incorporated herein by reference.

Release coated sheet material in accordance with the invention can be prepared in at least two ways, each of which will now be briefly discussed.

One way to prepare sheet material of the present invention is to coat the entire substrate with a fluorochemical polymer having the characteristics just discussed; thereafter, the entire surface is coated with a liquid carrier containing a curable polydimethylsiloxane gum and polymethylhydrogensiloxane. It is recognized that the silicone does not wet the fluorochemical polymer particularly well; without intending to be bound by theory, it is believed that it tends to form into small discrete "islands" on the surface of the fluorochemical polymer. After cure, these small islands are firmly bonded to the underlying fluorochemical polymer, the fluorochemical surface remaining exposed in areas to which the silicone is not bonded. Because the silicone and fluorochemical polymer display distinctly different individual release properties to normally tacky and pressure-sensitive adhesive, it appears that the resultant release surface has properties determined by the respective amounts of fluorochemical polymer surface and the silicone polymer surface which are exposed.

The manner of preparation just described results in a release surface having grossly the same properties over the entire area. In certain applications, e.g., in the manufacture of tape to be used in diaper closures, it may be desirable to have a release surface which has an area of locally higher release value; see, e.g., U.S. Pat. No. 3,646,937. Composite release coatings having these properties may be obtained by first applying fluorochemical polymer to a substrate in a pattern coating, for example, in stripes 3 to 6 mm wide spaced 3-50 mm apart. Since the fluorochemical polymer does not tend to wet and spread out over the entire surface, intervening areas of the substrate thus remain exposed between the stripes of fluorochemical polymer. Thereafter, a coating of silicone-forming composition is applied over the entire striped surface; the silicone wets the substrate more readily than the fluorochemical polymer and thus tends to concentrate in the uncoated area between the fluorochemical polymer stripes. The ultimate product, then, presents a surface which is predominantly alternating stripes of fluorochemical polymer and cured silicone.

TEST PROCEDURES

Contact angle. The nature of the fluorochemical polymer is determined by measuring the contact angle of 100% ethanol on the polymer surface. A glass plate is cleaned with methylisobutyl ketone, coated with a solution of fluorochemical polymer, and the solvent allowed to evaporate. A drop of 100% ethanol is placed on the fluorochemical polymer surface and the contact angle measured promptly, using conventional apparatus. The average of 10 separate measurement is taken as the contact angle.

To evaluate the effectiveness of a given release coating, two tests are commonly performed both before and after aging. Each will now be described briefly.

Adhesion to steel. A strip of tape approximately 25 cm long and 2.5 cm wide is placed, adhesive-side down on a carefully cleaned steel panel, and care exercised to ensure that no air bubbles are entrapped. The free end of the tape is then doubled back at an angle of 180° and about 2.5 cm peeled from the panel at the folded end. The exposed end of the panel is clamped in the lower jaw of a tensile testing machine and the free end of the tape clamped in the upper jaw. The jaws are then separated at the rate of 30.5 cm per minute, noting the force required to remove the tape.

The adhesive side of a second piece of tape is then placed in contact with the low adhesion backsize to be evaluated and artificially aged by allowing it to remain in contact with the surface for 15 days at 50° C. (This artificial aging has been found to give an indication of long-term natural aging.) The tape is then removed from the low adhesion backsize and applied to a freshly cleaned steel panel as in the preceding paragraph. Force to remove the tape from the panel should be at least 90% of the value previously measured, a lower value indicating that the release agent is transferring to the pressure-sensitive adhesive (provided, of course, that the adhesive is not adversely affected by aging but performs similarly in the absence of release agent).

Release value. To a cleaned steel panel is applied a 3.2-cm×12.7-cm strip of pressure-sensitive adhesive tape having an LAB of the type to be evaluated. A test tape (having a 25-micron biaxially oriented polyethylene terephthalate film backing to one face of which is firmly bonded a pigmented rubber-resin pressure-sensitive adhesive) is employed to evaluate release characteristics. The adhesive surface of a strip of test tape 2.5 cm wide and 25 cm long is placed in contact with the exposed LAB on the test panel and pressed down firmly, using a 2-kg roller, to exclude air bubbles. Using the same procedure as described in connection with the "adhesion to steel" test discussed above, the force required to remove the tape from the low adhesion backsize is measured. The force required to remove the tape is reported in grams per cm of width; the values both before and after aging should be in the range of 8-350 grams per cm width, values in the range of 20-80 grams per cm width being especially suitable for many diaper tape closure applications.

DESCRIPTION OF PRESENTLY PREFERRED EMBODIMENTS

Understanding of the invention will be further enhanced by referring to the following illustrative but non-limiting examples, in which all parts are by weight unless otherwise noted.

EXAMPLE 1

Into a 1-liter glass jaw was weighed 38 grams of a 45:45:10 N-methylperfluorooctylsulfonamidoethyl acrylate:(methyl perfluorooctylsulfonamidobutyl acrylate:toluene diisocyanate: hydroxypropylmethacrylate):butyl acrylate terpolymer, containing 5 parts N-octadecyl-2-methylaziridyl formamide (OMAF) and 561 grams of methylisobutyl ketone. The jar was then shaken for approximately 10 seconds to mix the components and form a 1.29% fluorochemical polymer solution. Using a 79 line/cm cellular pyramidal rotogravure roll and a medium-hard rubber roll as a support, the fluorochemical polymer solution was applied to the smooth face of a corona discharge-treated substantially unoriented film of crystalline white-pigmented polypropylene. The solution was then dried in an oven using countercurrent air flow at approximately 75° C. for one minute, after which the film containing the dried fluorochemical polymer coating (about 100 mg/m$^2$) was wound into a roll.

Into a 1-liter glass jar were weighed the following:

A 94:6 polydimethyl siloxane:polymethylhydrogensiloxane mixture, available from Dow Corning Corporation under the registered trademark designation "SYL OFF" 294—38 grams Heptane—365 grams Methylethyl ketone—95 grams Toluene—5 grams The jar was then put on a shaker for 30 minutes to allow the siloxanes to dissolve, after which 2.1 grams of a 50% solution of an amino-functional silane crosslinking agent (commercially available from Dow Corning Corporation under the trade designation C-4-2123) was added and the contents of the jar shaken for an additional 5 seconds. Next, 1.8 grams of dibutyltindiacetate catalyst was added and the contents of the jar again shaken to effect intimate mixing and form a 3% curable siloxane solution (exclusive of the crosslinking agent and catalyst).

Using the same procedure as was employed for applying the fluorochemical polymer solution (except that the pyramidal roll was replaced by a ruling mill having 59 lines per cm), the siloxane solution was coated over the fluorochemical polymercoated side of the polypropylene film. The overcoated film was then passed through a countercurrent oven containing 79° C. air for one minute, thereby evaporating the solvent and forming a cured silicone polymer weighing about 300 mg/m².

Test results for the composite fluorochemical polymer-silicone release surface are tabulated below:

TABLE I

| Contact angle of 100% ethanol on fluorochemical polymer surface | Adhesion to steel g/cm | | | Release value, g/cm | | |
|---|---|---|---|---|---|---|
| | Initial | After 15 days at 50° C. | After 6 months at 21° C. | Initial | After 15 days at 50° C. | After 6 months at 21° C. |
| 63.5° | 347 | 370 | 370 | 29.5 | 36.6 | 34.3 |

EXAMPLE 2

Example 1 was repeated with the single change that the concentration of the fluorochemical polymer in the coating solution was increased from the 1.25% of Example 1 to 2.71%. Results are tabulated below:

TABLE II

| Contact angle of 100% ethanol on fluorochemical polymer surface | Adhesion to steel g/cm | | | Release value, g/cm | | |
|---|---|---|---|---|---|---|
| | Initial | After 15 days at 50° C. | After 6 months at 21° C. | Initial | After 15 days at 50° C. | After 6 months at 21° C. |
| 63.5° | 302 | 336 | 347 | 42.5 | 54.7 | 42.5 |

EXAMPLES 3–10

It has been found that the results obtained are affected by the amount of fluorochemical polymer applied, the amount of silicone applied, and the percentage of toluene in the silicone carrier liquid. The following tabulated examples show the interreaction of these variables, Examples 1 and 2 being repeated in the interest of completeness:

TABLE III

| Example No. | Fluorochemical polymer concentration in solution, weight percent | Contact angle | Silicone concentration in carrier liquid, weight percent | Toluene concentration in carrier liquid, weight percent | Adhesion to steel g/cm | | Release value, g/cm | |
|---|---|---|---|---|---|---|---|---|
| | | | | | Initial | Heat Aged | Initial | Heat Aged |
| 3 | 0 | 63.5° | 3.0 | 20.0 | 426 | 459 | 3.15 | 1.57 |
| 4 | 0.23 | " | 1.9 | 10.4 | 380 | 448 | 28.0 | 17.7 |
| 5 | 0.23 | " | 4.1 | 10.4 | 392 | 504 | 7.09 | 1.57 |
| 6 | 0.50 | " | 1.0 | 20.0 | 437 | 459 | 288 | 285 |
| 7 | 0.50 | " | 3.0 | 36.0 | 381 | 459 | 248 | 282 |
| 8 | 0.50 | " | 5.0 | 20.0 | 414 | 470 | 135 | 232 |
| 9 | 0.77 | " | 1.9 | 10.4 | 336 | 437 | 75.6 | 78.7 |
| 1 | 1.29 | " | 3.0 | 1.08 | 347 | 370 | 29.5 | 36.6 |
| 2 | 2.71 | " | 3.0 | 1.08 | 302 | 336 | 42.5 | 54.7 |
| 10 | 3.00 | " | 3.0 | 6.00 | 269 | 302 | 64.6 | 124 |

EXAMPLES 11–21

The following examples show the relationship between the contact angle formed by a drop of 100% ethanol on the surface of a fluorochemical polymer film and the performance of a composite release coating made with that polymer and a silicone. In each case, the examples were made and tested as described in Example 1, except that (1) no pressure-sensitive adhesive was coated on the face side of the polypropylene film and (2) the fluorochemical polymer concentration was 2.5%. In order to obtain surfaces yielding a range of contact angles, the fluorochemical polymer employed in Example 1 was blended with various amounts of OMAF.

Results were as follows:

TABLE IV

| Example No. | Fluorochemical polymer:OMAF ratio | Contact angle | Release value, g/cm | |
|---|---|---|---|---|
| | | | Before overcoating with silicone | After overcoating with silicone |
| 11 | 95:5 | 63.5° | 65.4 | 48.4 |
| 12 | 85.5:14.5 | 61.0° | 58.7 | 46.9 |
| 13 | 76:24 | 57.4° | 65.8 | 55.1 |
| 14 | 66.5:33.5 | 51.2° | 65.4 | 80.3 |
| 15 | 57:43 | 52.8° | 87.0 | 92.1 |
| 16 | 47.5:52.5 | 39.5° | 93.3 | 142 |

TABLE IV-continued

| Example No. | Fluorochemical polymer:OMAF ratio | Contact angle | Release value, g/cm | |
|---|---|---|---|---|
| | | | Before overcoating with silicone | After overcoating with silicone |
| 17 | 38:62 | 33.5° | 114.6 | 90.2 |
| 18 | 28.5:71.5 | 36.2° | 328 | 114 |
| 19 | 19:81 | 33.2° | 378 | 85.0 |
| 20 | 9:91 | 30.8° | 448 | 15.0 |
| 21 | 0:100 | 0° | 506 | 3.2 |
| Control* | — | 27.6° | 315 | 2.0 |

*LAB polymer prepared according to Example 1 of Dixon U.S. Patent No. 3,318,852, containing on a mole basis, 13.1% N-ethyl-perfluorooctyl sulfonamido ethyl methacrylate, 84.6% acrylic acid and 2.3% N-octadecyl acrylate.

EXAMPLES 22–30

The following examples describe the preparation of composite backsizes in which the fluorochemical polymer of Example 1 was first applied to the backing in a pattern coating, leaving areas of the backing which are free from fluorochemical polymer. The fluorochemical polymer solution was applied in narrow strips, using a smooth steel roll, approximately 10 cm in diameter, having 63.5 mm wide cellular pyramidal rotogravure bands spaced 44.5 mm apart. Thereafter, using the same technique as in Example 1, silicone polymer was applied over the entire coated and uncoated side of the sheet material. In each case, the silicone solution preferentially flowed to the uncoated portion of the backing, although a few small dots of silicone may have remained on and bonded to the fluorochemical polymer surface.

| | |
|---|---|
| | oxymethylene:octadecyl methacrylate:butyl acrylate |
| C | 90 parts of B + 10 parts N-ethyl perfluorooctylsulfonamido butanol:(TDI*)₃:polycarbodiimide |
| D | 57:28:15 N-methyl perfluorooctylsulfonamidoethyl methacrylate:ethyl perfluorooctylsulfonamidoethyl acrylate [:TDI*]: hydroxypropyl methacrylate |
| E | 57:28:15 N-methyl perfluorooctyl sulfonamidoethyl methacrylate:N-ethyl perfluorooctylsulfonamidoethyl acrylate[:TDI*]:hydroxypropyl methacrylate:butyl acrylate |
| F | 55:35:10 N-methyl perfluorooctylsulfonamidoethyl acrylate:N-methyl perfluorooctylsulfonamidobutyl acrylate[:TDI*]:hydroxypropyl methacrylate:butyl acrylate |

*toluene 2,4-diisocyanate

TABLE V

| Example No. | Fluorochemical polymer concentration weight percent | Silicone concentration weight percent | Toluene concentration in carrier liquid, weight percent | Release value, g/cm measured at 51 mm/minute | | |
|---|---|---|---|---|---|---|
| | | | | Initial | After 15 days at 50° C. | After 6 months at 21° C. |
| 22 | 1 | 1 | 6 | 63.4 | 137 | 92.5 |
| 23 | 1 | 1 | 40 | 212 | 277 | 215 |
| 24 | 1 | 6 | 6 | 8.7 | 7.5 | 9.1 |
| 25 | 1 | 6 | 40 | 27.2 | 29.9 | 38.6 |
| 26 | 3 | 2.5 | 23 | 168 | 182 | 143 |
| 27 | 9 | 1 | 6 | 240 | 246 | 202 |
| 28 | 9 | 1 | 40 | 264 | 247 | 202 |
| 29 | 9 | 6 | 6 | 115 | 146 | 115 |
| 30 | 9 | 6 | 40 | 175 | 119 | 106 |

EXAMPLES 31–36

The examples tabulated below were made in the same manner as Example 26 (except that the toluene concentration was 4%) using other fluorochemical polymers. For comparison, there is included Example "Control", a fluorochemical polymer of the type disclosed in U.S. Pat. No. 3,318,852, recommended for use as low adhesion backsizes on normally tacky and pressure-sensitive adhesive tape. The types of fluorochemical polymer in each of the examples is designated by abbreviations, viz.,

| | |
|---|---|
| Control | 55:40:5 N-ethyl perfluorooctylsulfonamidoethyl methacrylate:acrylic acid:octadecyl acrylate terpolymer, as shown in Example I of U.S. Patent No. 3,318,852 |
| A | 65:35 N-methyl perfluorooctylsulfonamidoethyl methacrylate:octadecyl methacrylate |
| B | 35:35:20:10 N-methyl perfluorooctylsulfonamidoethyl methacrylate:N-methyl perfluorooctylsulfonamidobutyl methacrylate:poly- |

TABLE VI

| Example No. | Type fluorochemical polymer | Contact Angle | Release value, g/cm |
|---|---|---|---|
| Control | | 27.6° | 2.0 |
| 31 | A | 49.0° | 39.4 |
| 32 | B | 50.4° | 110 |
| 33 | C | 47.6° | 19.7 |
| 34 | D | 50.4° | 138 |
| 35 | E | >63° | 39.4 |
| 36 | F | >63° | 31.5 |

"Striped" products are especially useful in the manufacture of diaper closure systems of the type disclosed in U.S. Pat. No. 3,646,937, where a pressure-sensitive adhesive-coated release liner strip is adhered to the inner aspect of a first diaper edge to provide an exposed release surface. A first end of a closure tape is then adhered permanently to the outer aspect of the same diaper edge, the second end of the closure tape being folded around the diaper edge and temporarily adhered to the release surface. The fluorochemical polymer stripe presents a narrow area of locally high adhesion and thus prevents premature unfolding of the closure, while the silicone surface permits the user to readily grasp and unfold the second end of the closure tape for attachment to a juxtaposed second diaper edge.

I claim:

1. Sheet material provided with a composite release surface comprising first and second coatings on at least one side, normally tacky and pressure-sensitive adhesive adhering less strongly to the coatings than to the same sheet material in the absence of the coatings, the exposed release surface consisting essentially of areas of said first coating and other areas of said second coating said first coating consisting essentially of a solid fluorochemical polymer having surface energy characteristics such that a drop of 100% ethanol forms a contact angle of at least 30° when placed on the surface of a smooth dry film of said fluorochemical polymer, and said second coating consisting essentially of a cured silicone polymer consisting essentially of polydimethylsiloxane gum, crosslinked with polymethylhydrogensiloxane, whereby pressure-sensitive adhesive exhibits an average adhesion to the composite release surface in the range of 8-350 g/cm width, less than to said first coating alone and greater than to said second coating alone.

2. The sheet material of claim 1 wherein the coatings are bonded to only one side of said sheet material and a layer of normally tacky and pressure-sensitive adhesive is firmly bonded to the other side of said backing, thereby forming a pressure-sensitive adhesive tape.

3. The pressure-sensitive adhesive tape of claim 2 wherein the first coating is coated uniformly over substantially all of said one side and the second coating is distributed over the surface of said first coating and bonded firmly thereto.

4. The tape of claim 3 wherein the backing is polypropylene film.

5. The pressure-sensitive adhesive tape of claim 2 wherein the first coating and the second coating are each bonded directly to said one side.

6. The tape of claim 5 wherein the backing is polypropylene film.

7. The pressure-sensitive adhesive tape of claim 2 wherein the first coating is a polymer of moieties consisting essentially of (a) at least one perfluoroalkylsulfonamidoalkyl acrylate, (b) perfluoroalkylsulfonamido alkanol:toluene diisocynate:hydroxypropylmethacrylate reaction product, and (c) 0-10% by weight, based on total polymer, of lower alkyl acrylate.

8. The tape of claim 7 wherein the polymethylhydrogensiloxane content of the second coating is on the order of 2-20%.

9. The tape of claim 8 wherein the polymethylhydrogensiloxane content of the second coating is about 4%.

10. The tape of claim 7 wherein the polydimethylsiloxane is further crosslinked with aminofunctional silane.

11. A method of making the sheet material of claim 1, comprising the steps of a. applying to one side of a sheet material an organic solvent solution of a polymer of moieties consisting essentially of (1) at least one perfluorooctylsulfonamido lower alkyl acrylate, (2) perfluorosulfonamido butanol:toluene diisocyanate:hydroxypropyl methacrylate reaction product and (3) 0-10% by weight, based on total polymer of lower alkyl acrylate, b. evaporating the solvent to leave a layer of solid fluorochemical polymer bonded adherently to said sheet material, c. applying over the entire surface on said one side a uniform coating of a liquid carrier containing co-reactants consisting essentially of a major portion of polydimethylsiloxane gum, a minor portion of polymethylhydrogensiloxane and an effective amount of a polyvalent metal salt catalyst, said coating having only a limited tendency to wet said fluorochemical polymer and hence tending to form discrete areas thereon and preferentially wet any area on said one side not coated with fluorochemical polymer, thereby leaving areas of fluorochemical polymer exposed, and d. evaporating the liquid carrier and reacting the co-reactants to form a cured silicone polymer, thereby providing said one side of said sheet material with a composite release surface displaying areas of fluorochemical polymer and areas of cured silicone polymer.

12. A method of making the tape of claim 3 comprising the steps of:

a. applying uniformly to one side of a sheet backing material an organic solvent solution of a polymer consisting essentially of (1) at least one perfluorooctylsulfonamido lower alkyl acrylate, (2) perfluorosulfonamido butanol:toluene diisocyanate: hydroxypropyl methacrylate reaction product and (3) 0-10% by weight, based on total polymer of lower alkyl acrylate, b. evaporating the solvent to leave a uniform layer of solid fluorochemical polymer over and bonded adherently to said backing, c. applying to substantially the entire exposed surface of said solid fluorochemical polymer a liquid carrier containing co-reactants consisting essentially of a major portion of polydimethylsiloxane gum, a minor portion of polymethylhydrogensiloxane and an effective amount of a catalyst, said coating having only a limited tendency to wet said fluorochemical polymer and hence tending to form discrete areas thereon, d. evaporating the liquid carrier and reacting the co-reactants to leave a cured silicone coated over and adhered to said fluorochemical polymer, and e. bonding a layer of normally tacky and pressure-sensitive adhesive to the other side of said sheet backing material.

13. A method of making the tape of claim 5 comprising the steps of:

a. applying to one side of a sheet backing material a pattern coating of an organic solvent solution of a polymer consisting essentially of (1) perfluoroalkylsulfonamido lower alkyl acrylate, (2) perfluorosulfonamido butanol-toluene diisocyanate: hydroxypropyl methacrylate reaction product and (3) 0-10% by weight, based on total polymer, of lower alkyl acrylate, b. evaporating the solvent to leave a patterned layer of solid fluorochemical polymer firmly bonded to discrete areas of said one side and, between said discrete areas, intervening areas on which fluorochemical polymer is absent, c. applying over the entire surface of said one side, including both areas on which fluorochemical polymer is present and areas on which fluorochemical polymer is absent, a coating of liquid carrier containing co-reactants consisting essentially of a major portion of polydimethylsiloxane gum, a minor portion of polymethylhydrogensiloxane, and an effective amount of catalyst, said coating preferentially wetting the areas on said one face from which fluorochemical polymer is absent, d. evaporating said liquid carrier and heating sufficiently to cause said co-reactants to react to form a cured silicone polymer and bond to the areas on said one side from which fluorochemical polymer is absent, thereby providing said one side with a coating of release composite in which the fluorochemical polymer and the cured silicone polymer are bonded to separate areas of said one side, and e. bonding a layer of normally tacky and pressure-sensitive adhesive to the other side of said sheet backing material.

* * * * *